(12) United States Patent
Shimizu et al.

(10) Patent No.: US 10,670,952 B2
(45) Date of Patent: Jun. 2, 2020

(54) WAVELENGTH CONVERTER, LIGHT SOURCE APPARATUS, AND PROJECTOR

(71) Applicant: SEIKO EPSON CORPORATION, Tokyo (JP)

(72) Inventors: Tetsuo Shimizu, Matsumoto (JP); Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/365,790

(22) Filed: Mar. 27, 2019

(65) Prior Publication Data

US 2019/0302592 A1    Oct. 3, 2019

(30) Foreign Application Priority Data

Mar. 28, 2018 (JP) .................. 2018-061408

(51) Int. Cl.
| | |
|---|---|
| *G03B 21/20* | (2006.01) |
| *G03B 21/16* | (2006.01) |
| *H04N 9/31* | (2006.01) |
| *G03B 21/00* | (2006.01) |

(52) U.S. Cl.
CPC ......... *G03B 21/204* (2013.01); *G03B 21/006* (2013.01); *G03B 21/16* (2013.01); *H04N 9/3158* (2013.01); *H04N 9/3161* (2013.01)

(58) Field of Classification Search
CPC .... G03B 21/204; G03B 21/16; G03B 21/006; G03B 21/2073; G03B 21/10; H04N 9/3161; H04N 9/3158; H04N 9/3141; F21V 2115/30; F21V 9/16
See application file for complete search history.

(56) References Cited

U.S. PATENT DOCUMENTS

| | | | |
|---|---|---|---|
| 10,114,276 B2* | 10/2018 | Kobayashi | ............. G03B 21/00 |
| 2017/0180686 A1 | 6/2017 | Chen | |
| 2017/0293211 A1 | 10/2017 | Kobayashi et al. | |
| 2017/0315432 A1 | 11/2017 | Takamatsu | |
| 2020/0004118 A1* | 1/2020 | Hsu | ...................... G02B 26/008 |

FOREIGN PATENT DOCUMENTS

| | | |
|---|---|---|
| JP | 2017-111418 A | 6/2017 |
| WO | 2016/056285 A1 | 4/2016 |
| WO | 2016/075853 A1 | 5/2016 |

* cited by examiner

*Primary Examiner* — William C. Dowling
(74) *Attorney, Agent, or Firm* — Oliff PLC (57) ABSTRACT

A wavelength converter to which the invention is applied includes a phosphor that converts the wavelength of blue light to emit fluorescence, a rotating mechanism that rotates the phosphor around an axis of rotation that extends in a light incident direction in which the blue light is incident, and a heat insulating member that is provided between the phosphor and the rotating mechanism in the light incident direction. The phosphor has a coinciding section that coincides with the rotating mechanism when viewed in the light incident direction.

20 Claims, 5 Drawing Sheets

WAVELENGTH CONVERTER, LIGHT SOURCE APPARATUS, AND PROJECTOR

BACKGROUND

1. Technical Field

The present invention relates to a wavelength converter, a light source apparatus, and a projector.

2. Related Art

In recent years, some light source apparatuses for projector use fluorescence. Such a light source apparatus includes a phosphor (or wavelength conversion element) that is excited with excitation light outputted from a solid-state light source and incident on the phosphor to emit fluorescence having a wavelength different from the wavelength of the excitation light. The phosphor is provided on a surface of a disk-shaped substrate, formed in a ring shape when viewed in the excitation light incident direction, and so driven as to rotate around an axis of rotation perpendicular to the surface of the substrate. For example, International Publication No. 2016/056285 discloses a phosphor wheel including a phosphor layer formed on a disk-shaped substrate and a plurality of heat dissipating fins that overlap with one another when viewed in the direction perpendicular to a surface of the substrate.

In recent years, reduction in size of a projector has been increasingly required, and attempts to reduce the size of a phosphor wheel and the size of a light source apparatus including the phosphor wheel have therefore been made. In the phosphor wheel described in International Publication No. 2016/056285, however, a size reduction attempt made by setting the diameter of the phosphor layer to be roughly equal to the diameter of a rotating mechanism (motor, for example) prevents the heat dissipating fins from being provided on a side of the substrate that is the side opposite the phosphor layer, resulting in conduction of heat generated in the phosphor to the rotating mechanism and hence a problem of degradation of reliability of the rotating mechanism.

SUMMARY

An advantage of some aspects of the invention is to provide a wavelength converter that is compact and increases the reliability of a rotating mechanism for rotating a wavelength conversion element (phosphor) and further provide a reliable light source apparatus and projector including the wavelength converter.

According to a first aspect of the invention, there is provided a wavelength converter including a wavelength conversion element that converts a wavelength of first light to emit second light having a wavelength different from the wavelength of the first light, a rotating mechanism that rotates the wavelength conversion element around an axis of rotation that extends in a direction in which the first light is incident, and a first heat insulating member that is provided between the wavelength conversion element and the rotating mechanism in the first light incident direction, and the wavelength conversion element has a coinciding section that coincides with the rotating mechanism when viewed in the first light incident direction.

The wavelength converter according to the first aspect may further include a substrate to which the wavelength conversion element is fixed. The rotating mechanism may include a shaft member that rotates around the axis of rotation and a rotary member that is fixed to the shaft member and rotates when the shaft member rotates, and the rotary member may fix the substrate via the first heat insulating member.

In the wavelength converter according to the first aspect, the first heat insulating member may extend between the shaft member and the substrate.

In the wavelength converter according to the first aspect, a second heat insulating member having a heat insulating property different from a heat insulating property of the first heat insulating member may be provided between the shaft member and the substrate.

In the wavelength converter according to the first aspect, an air gap may be provided between the first heat insulating member, which is provided between the shaft member and the substrate, and the substrate or between the first heat insulating member, which is provided between the shaft member and the substrate, and the shaft member.

In the wavelength converter according to the first aspect, an air gap may be provided between the second heat insulating member and the substrate or between the second heat insulating member and the shaft member.

In the wavelength converter according to the first aspect, the first heat insulating member provided between the wavelength conversion element and the rotating mechanism may be provided with a small area section having a cross-sectional area in a direction that intersects a direction in which a heat flux from the wavelength conversion element travels, the cross-sectional area being smaller than cross-sectional areas of other portions of the first heat insulating member.

In the wavelength converter according to the first aspect, a maximum radius of the substrate measured from the axis of rotation when viewed in the first light incident direction may be greater than or equal to 100% but smaller than or equal to 130% of a maximum radius of the wavelength conversion element.

According to the first aspect of the invention, there is also provided a light source apparatus including the wavelength converter described above and a light source that outputs the first light toward the wavelength conversion element.

According to the first aspect of the invention, there is also provided a projector including the light source apparatus described above, a light modulator that modulates light from the light source apparatus in accordance with image information to form image light, and a projection system that projects the image light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

Figure 1:
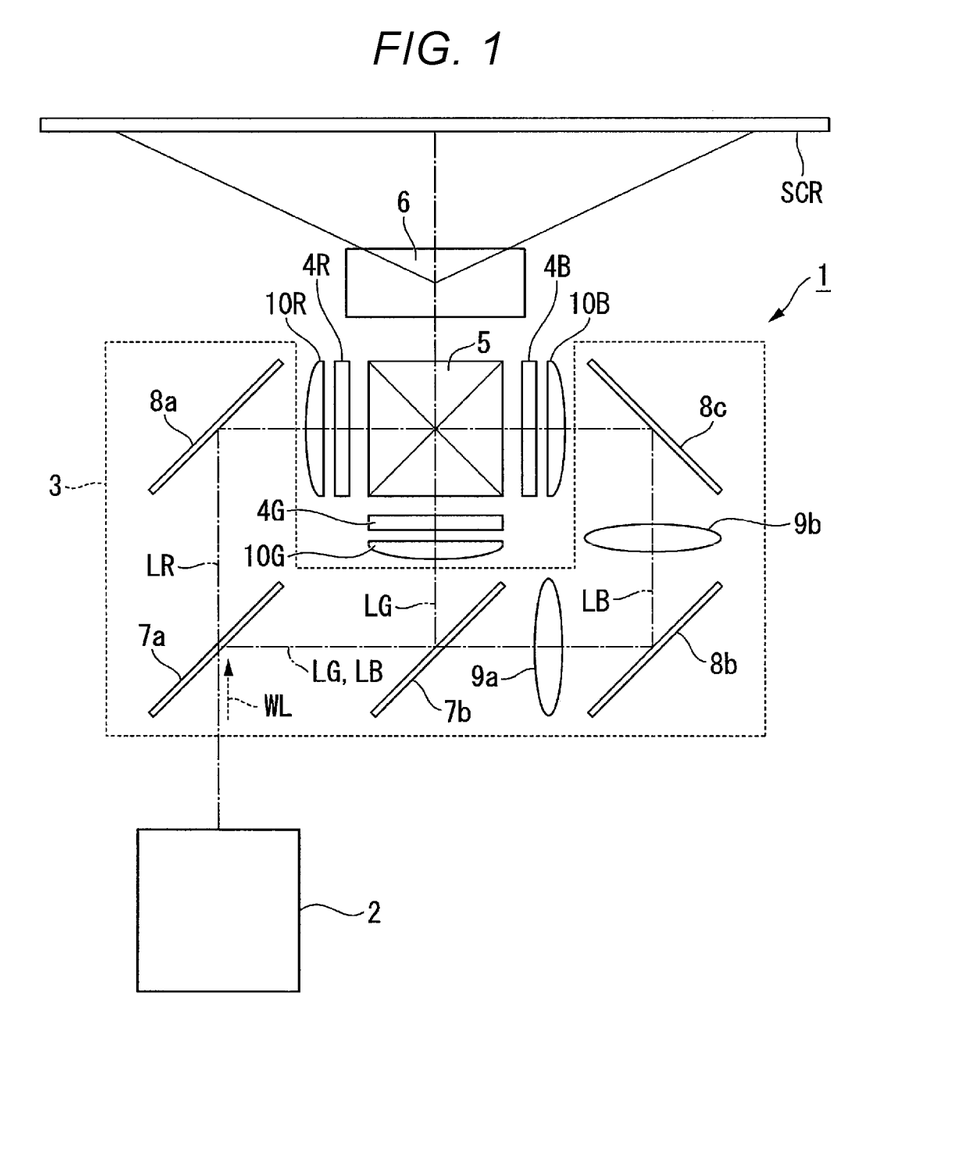
FIG. 1 is a schematic view showing the configuration of a projector according to a first embodiment.

An example of an illuminator and a projector according to a first embodiment of the invention will first be described. FIG. 1 is a schematic view showing the configuration of a projector 1 according to the first embodiment.

Projector

The projector 1 according to the first embodiment is a projection-type image display apparatus that displays color video images on a screen SCR, as shown in FIG. 1. The projector 1 includes an illuminator 2, a color separation system 3, light modulators 4R, 4G, and 4B, a light combining system 5, and a projection system 6.

The illuminator 2 outputs illumination light WL containing at least light fluxes having the three primary colors, that is, red light LR, green light LG, and blue light LB (see FIG. 1). The color separation system 3 separates the illumination light WL into the red light LR, the green light LG, and the blue light LB.

The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the illuminator 2 into the red light LR and the other light (green light LG and blue light LB). The first dichroic mirror 7a transmits the red light LR and reflects the other light (green light LG and blue light LB). On the other hand, the second dichroic mirror 7b reflects the green light LG and transmits the blue light LB to separate the other light described above into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a is disposed in the optical path of the blue light LB and on the light incident side of the second total reflection mirror 8b. The second relay lens 9b is disposed in the optical path of the blue light LB and on the light exiting side of the second total reflection mirror 8b. The first relay lens 9a and the second relay lens 9b have the function of compensating optical loss of the blue light LB resulting from the fact that the optical path length of the blue light LB is longer than the optical path lengths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

A transmissive liquid crystal panel is, for example, used as each of the light modulators 4R, 4G, and 4B. Polarizers (not shown in FIG. 1) are disposed on the light incident side and the light exiting side of each of the liquid crystal panels.

Field lenses 10R, 10G, and 10B are disposed on the light incident side of the light modulators 4R, 4G, and 4B, respectively. The field lenses 10R, 10G, and 10B collimate the red light LR, the green light LG, and the blue light LB to be incident on the light modulators 4R, 4G, and 4B, respectively.

The image light fluxes from the light modulators 4R, 4G, and 4B enter the light combining system 5. The light combining system 5 combines the image light fluxes corresponding to the red light LR, the green light LG, and the blue light LB with one another and causes the combined image light to exit toward the projection system 6. The light combining system 5 is formed, for example, of a cross dichroic prism.

The projection system 6 enlarges the combined image light from the light combining system 5 and projects the enlarged image light toward the screen SCR. Enlarged color video images are displayed on the screen SCR. The projection system 6 is formed, for example, of a lens unit or a projection lens group formed of a lens barrel and a plurality of lenses disposed in the lens barrel.

Illuminator

Figure 2:
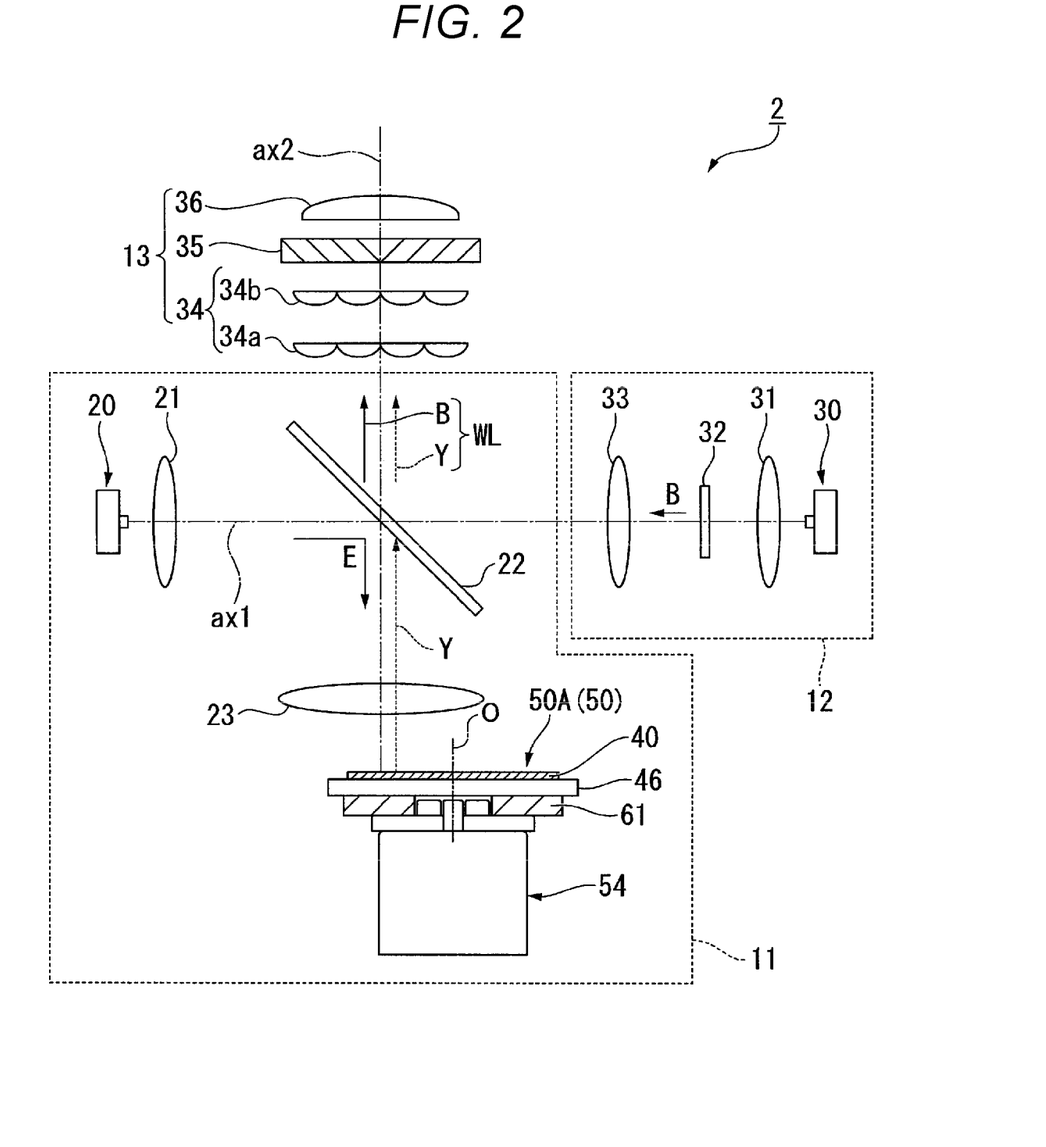
FIG. 2 is a schematic view of an illuminator of the projector shown in FIG. 1.

FIG. 2 is a schematic view showing the configuration of the illuminator 2. The illuminator 2 includes a first light source apparatus (light source apparatus) 11, a second light source apparatus 12, and a uniform illumination system 13, as shown in FIG. 2.

Light Source Apparatuses

The first light source apparatus 11 includes an excitation light source (light source) 20, a collimation system 21, a dichroic mirror 22, a light focusing system 23, and a wavelength converter 50.

The excitation light source 20 is formed of a semiconductor laser that outputs, as excitation light, blue light (first light) E formed of a laser beam. The excitation light source 20 may be formed of a single semiconductor laser or a plurality of semiconductor lasers. The excitation light source 20 is so disposed that an optical axis ax1 of the blue light E before reflected off the dichroic mirror 22 is perpendicular to an illumination optical axis ax2.

The collimation system 21 is formed, for example, of one or more convex lenses and roughly parallelizes the light from the excitation light source 20.

The dichroic mirror 22 is so disposed in the optical path from the collimation system 21 to the light focusing system 23 as to intersect the optical axis ax1 of the excitation light source 20 and the illumination optical axis ax2 by 45°. The dichroic mirror 22 is optically characterized in that it reflects the blue light E and transmits yellow fluorescence Y (second light) containing red light and green light.

The light focusing system 23 is formed, for example, of one or more convex lenses and has the function of causing the blue light E from the dichroic mirror 22 to enter the wavelength converter 50 with the blue light E roughly focused and the function of picking up the fluorescence Y emitted from the wavelength converter 50. The configuration of the wavelength converter 50 will be described later.

The second light source apparatus 12 includes a second light source 30, a light focusing system 31, a diffuser 32, and a collimation system 33.

The second light source 30 is formed of at least one semiconductor laser, as is the excitation light source 20 of the first light source apparatus 11. An optical axis of the second light source 30 coincides with the optical axis ax1. The light focusing system 31 is formed, for example, of one or more convex lenses and focuses blue light B outputted from the second light source 30 in the vicinity of the diffuser 32.

The diffuser 32 scatters the blue light B outputted from the second light source 30 in such away that the scattered blue light B has a light orientation distribution similar to the light orientation distribution of the fluorescence Y emitted from the wavelength converter 50. The diffuser 32 is made, for example, of ground glass.

The collimation system 33 is formed, for example, of one or more convex lenses and collimates the light from the diffuser 32.

The blue light B from the second light source apparatus 12 is reflected off the dichroic mirror 22 and combined with the fluorescence Y having been emitted from the wavelength converter 50 and having passed through the dichroic mirror 22 to produce the white illumination light WL. The illumination light WL enters the uniform illumination system 13.

The uniform illumination system 13 includes an optical integration system 34, a polarization conversion element 35, and a superimposing lens 36.

The optical integration system 34 divides the illumination light WL into a plurality of thin light fluxes. The optical integration system 34 is formed, for example, of a first lens array 34a and a second lens array 34b. The first lens array 34a and the second lens array 34b each include a plurality of microlenses arranged in an array.

The illumination light WL having exited out of the optical integration system 34 enters the polarization conversion element 35 in the form of the plurality of thin light fluxes. The polarization conversion element 35 converts the illumination light WL into linearly polarized light. The polarization conversion element 35 is formed, for example, of polarization separation films, retardation films, and mirrors.

The illumination light WL converted into linearly polarized light enters the superimposing lens 36. The superimposing lens 36 superimposes the plurality of thin light fluxes having exited out of the polarization conversion element 35 with one another on an illumination target object. The configuration described above allows the illumination target object to be uniformly illuminated.

Wavelength Converter

Figure 3:
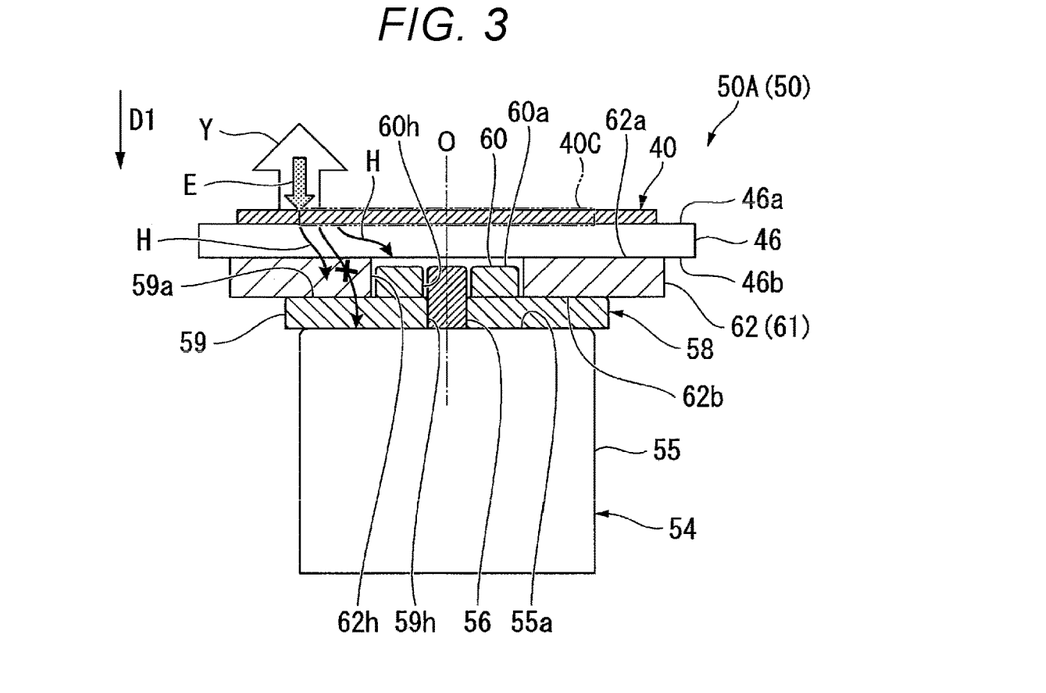
FIG. 3 is a side view of a wavelength converter according to the first embodiment and can be used in a light source apparatus of the illuminator shown in FIG. 2.

FIG. 3 is a side view of a wavelength converter 50A according to the first embodiment. The wavelength converter 50A includes at least a phosphor (wavelength conversion element) 40, which converts the wavelength of the blue light E as the excitation light to emit the fluorescence Y having a wavelength different from the wavelength of the blue light E, a rotating mechanism 54, which rotates the phosphor 40 around an axis of rotation O, which extends in a light incident direction D1, in which the blue light E is incident (hereinafter simply referred to as light incident direction D1 in some cases), and a heat insulating member (first heat insulating member) 61, which is provided between the phosphor 40 and the rotating mechanism 54 in the light incident direction D1. In the following description, the heat insulating member 61 interposed between the phosphor 40 and the rotating mechanism 54 in the light incident direction D1 is particularly called a heat insulating member 62.

The wavelength converter 50A further includes a substrate 46, to which the phosphor 40 is fixed, and the phosphor 40 is attached to a surface 46a of the substrate 46, which is the surface on which the blue light E is incident, for example, with an appropriate adhesive. The phosphor 40 has a coinciding section 40C, which coincides with the rotating mechanism 54 when viewed in the light incident direction D1. A region where the phosphor 40 is irradiated with the blue light E when viewed in the light incident direction D1 has an appropriately set size (ranging from about 10 to 20 mm, for example) and at least overlaps with the coinciding section 40C.

In the first embodiment, the phosphor 40 has a disc-like shape around the axis of rotation O when viewed in the light incident direction D1 and is disposed in a radially central portion of the surface 46a of the substrate 46. The term "radially" described above represents the radial direction extending from the axis of rotation O and defined in a plane perpendicular to the axis of rotation O. That is, the coinciding section 40C is a central portion of the phosphor 40 containing the axis of rotation O when viewed in the light incident direction D1.

In the following description, the upstream side of the light incident direction D1 (the side opposite the side toward which the blue light E travels) is called an upper side, the downstream side of the light incident direction D1 (the side toward which the blue light E travels) is called a lower side, and the direction along a plane perpendicular to the light incident direction D1 and the axis of rotation O is called a rightward/leftward direction in some cases.

The phosphor 40, on which the blue light E is incident, converts the wavelength of the blue light E and emits the fluorescence Y. The phosphor 40 is not necessarily made of a specific material and can be made of any material that converts the wavelength of the blue light E and emits the fluorescence Y as described above. In the first embodiment, the phosphor 40 is made, for example, of YAG:Ce, which is a $Y_3Al_5O_{12}$ garnet crystal (YAG) to which a cerium ion ($Ce^{3+}$, for example) is added. The phosphor 40 may contain an appropriate scattering element (not shown).

The substrate 46 has a disc-like shape around the axis of rotation O when viewed in the light incident direction D1, as shown in FIGS. 2 and 3, and the rotating mechanism 54 rotates the substrate 46 at a predetermined rotational speed when the projector 1 (see FIG. 1) is used. Continuous incidence of the blue light E on a specific region of the phosphor 40 is thus avoided, whereby the life of the phosphor 40 is prolonged. The substrate 46 is made of a metal material that excels in heat dissipation and reflectivity, for example, formed of an aluminum plate so that a heat flux H generated in the phosphor 40 is dissipated and the fluorescence Y exits in parallel to the light incident direction D1 but in the direction opposite the light incident direction D1.

The maximum radius of the substrate 46 measured from the axis of rotation O when viewed in the light incident direction D1 is preferably roughly equal to the maximum radius of the phosphor 40 and is specifically preferably greater than or equal to 100% but smaller than or equal to 130% of the maximum radius of the phosphor 40. When the rightward/leftward size of the substrate 46 is roughly equal to the rightward/leftward size of the phosphor 40, as described above, the size of the wavelength converter 50A is reduced with rightward/leftward spread of the heat flux H generated in the phosphor 40 suppressed.

The rotating mechanism 54 includes a motor main body 55, a shaft member 56, and a hub (rotary member) 58, as shown in FIG. 3. The motor main body 55 has, for example, a known motor structure including a rotor and a stator that are not shown. The rotor described above may be an inner rotor or an outer rotor. The shaft member 56 is inserted into the motor main body 55 and protrudes upward along the axis of rotation O beyond an upper surface 55a of the motor main body 55. The shaft member 56 rotates around the axis of rotation O when the motor main body 55 operates. The hub 58 includes an annular flange 59 and an annular protrusion 60, the outer circumference radius of which is smaller than that of the flange 59. Through holes 59h and 60h are formed at the radial centers of the flange 59 and the protrusion 60, respectively. The flange 59 is so disposed as to be in contact with the surface 55a of the motor main body 55 and the outer circumferential surface of the shaft member 56 with the shaft member 56 passing through the through hole 59h. The protrusion 60 is so disposed as to be in contact with an upper surface 59a of the flange 59 and to be separate from the shaft member 56 with the shaft member 56 passing through the through hole 60h. The configuration described above allows the hub 58 to be fixed to the shaft member 56 and to rotate around the axis of rotation O when the shaft member 56 rotates.

The hub 58 of the rotating mechanism 54 fixes the substrate 46 via the heat insulating member 62. That is, at least a rightward/leftward central portion of a lower surface 62b of the heat insulating member 62 is in contact with the upper surface 59a of the flange 59. An upper surface 62a of the heat insulating member 62 is in contact with a lower surface 46b of the substrate 46.

In the first embodiment, the heat insulating member 62 has a hole 62h in a central portion containing the axis of rotation O when viewed in the light incident direction D1. The protrusion 60 of the hub 58 and an upper portion of the shaft member 56 are disposed in the hole 62h. The heat insulating member 62 (61) is not limited to a specific member and can be any member that provides the effect of suppressing conduction of the heat flux H generated in the phosphor 40. For example, a resin-based heat insulating material, such as a thermo-resin, can be used. The heat insulating member 62 (61), which is disposed as described above, preferably has a characteristic (such as strength) that allows the heat insulating member 62 (61) to function as a spacer between the substrate 46 and the hub 58. In a case where the heat insulating member 62 (61) is made of a metal-based heat insulating material, the material preferably has low thermal conductivity.

The wavelength converter 50A according to the first embodiment described above provides the following effects.

The wavelength converter 50A according to the first embodiment includes the phosphor 40, the rotating mechanism 54, and the heat insulating member 62 described above, and the phosphor 40 has the coinciding section 40C, which coincides with the rotating mechanism 54 when viewed in the light incident direction D1. The wavelength converter 50A further includes the substrate 46, to which the phosphor 40 is fixed, and the rotating mechanism 54 includes the shaft member 56, which rotates around the axis of rotation O, and the hub 58, which rotates around the axis of rotation O when the shaft member 56 rotates. Further, the hub 58 fixes the substrate 46 via the heat insulating member 62. According to the configuration described above, the size of the phosphor 40 is closer to the size of the rotating mechanism 54 when viewed in the light incident direction D1 than in related art, whereby the size of the wavelength converter 50A can be reduced. Since the heat insulating member 62 is provided between the phosphor 40 and the rotating mechanism 54 with the length of the outer circumference of the phosphor 40 reduced as described above, the heat insulating member 62 can block the heat generated in the phosphor 40 and dissipated toward the rotating mechanism 54 and can therefore prevent a decrease in the reliability of the rotating mechanism 54 due to the conduction of the heat generated in the phosphor 40 to the rotating mechanism 54.

In the wavelength converter 50A according to the first embodiment, the maximum radius of the substrate 46 measured from the axis of rotation O when viewed in the light incident direction D1 is preferably greater than or equal to 100% but smaller than or equal to 130% of the maximum radius of the phosphor 40. According to the configuration described above, the sizes of the substrate 46 and the phosphor 40 viewed in the light incident direction D1 can be made roughly equal to the size of the rotating mechanism 54, whereby the size of the wavelength converter 50A can be further smaller than a wavelength converter of related art.

The light source apparatus 11 according to the first embodiment provides the following effect.

The first light source apparatus 11 according to the first embodiment includes the wavelength converter 50A according to the first embodiment and the excitation light source 20, which outputs the blue light E to the phosphor 40. The first light source apparatus 11 can be highly reliable by the prevention of a decrease in the reliability of the rotating mechanism 54 as described above.

The projector 1 according to the first embodiment described above provides the following effect.

The projector 1 according to the first embodiment includes the first light source apparatus 11 according to the first embodiment, the light modulators 4B, 4G, and 4R, which modulate the blue light LB, the green light LG, and the red light LR from the first light source apparatus 11 in accordance with image information to form image light, and the projection system 6, which projects the image light described above. The projector 1 can therefore be reliable and form and project a high-luminance image by using the first light source apparatus 11, which suppresses a decrease in the reliability of the rotating mechanism 54 as described above.

Second Embodiment

A wavelength converter, a light source apparatus, and a projector according to a second embodiment will subsequently be described. The second embodiment differs from the first embodiment in terms of the configuration of the wavelength converter, and the other configurations of the light source apparatus and the projector are the same in the first and second embodiments. Therefore, in the following description, the configuration of the wavelength converter in the second embodiment, which differs from the configuration of the wavelength converter in the first embodiment, will be primarily described, and the same configurations and members as those in the first embodiment have the same reference characters and will not be described in detail.

Figure 4:
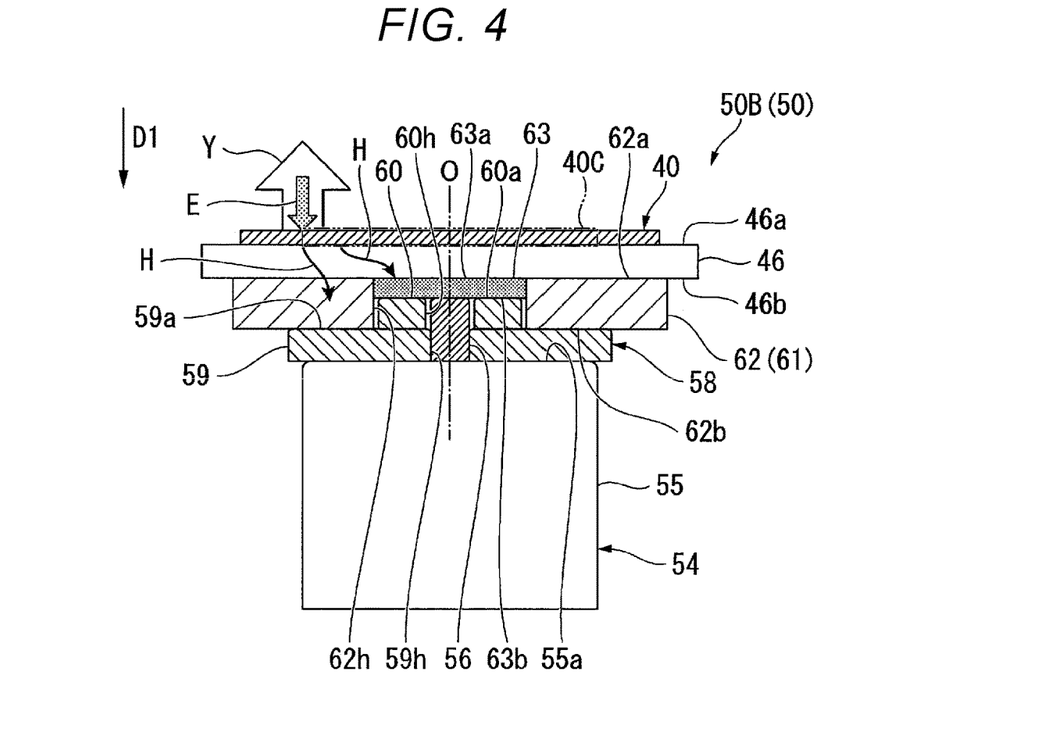
FIG. 4 is a side view of a wavelength converter according to a second embodiment and can be used in the light source apparatus of the illuminator shown in FIG. 2.

FIG. 4 is a side view of a wavelength converter 50B according to the second embodiment. In the wavelength converter 50B, a heat insulating member (second heat insulating member) 63, which has a heat insulating property different from that of the heat insulating member 62, is provided between the shaft member 56 and the substrate 46 in addition to the configuration of the wavelength converter 50A according to the first embodiment, as shown in FIG. 4.

The hub 58 of the rotating mechanism 54 fixes the substrate 46 via the heat insulating member 63 in addition to the heat insulating member 62. A lower surface 63b of the heat insulating member 63 is in contact with an upper surface 60a of the protrusion 60. An upper surface 63a of the heat insulating member 63 is in contact with the lower surface 46b of the substrate 46.

The heat insulating member 63 is not limited to a specific member and can be any member that provides the effect of suppressing conduction of the heat flux H generated in the phosphor 40 and has a heat insulating property different from that of the heat insulating member 62 as described above. For example, the heat insulating member 63 is preferably made of an inorganic heat insulating material, such as glass wool, asbestos, rock wool, and carbon fibers.

The wavelength converter 50B, the light source apparatus, and the projector according to the second embodiment described above provide the following effects.

The wavelength converter 50B, the light source apparatus, and the projector according to the second embodiment, which have at least the same basic configurations as those of the wavelength converter 50A, the light source apparatus, and the projector according to the first embodiment, provide the same advantageous effects as those provided by the wavelength converter 50A, the light source apparatus, and the projector according to the first embodiment. That is, according to the wavelength converter 50B according to the second embodiment, the heat insulating member 62 can block the heat generated in the phosphor 40 and dissipated toward the rotating mechanism 54 and can therefore prevent a decrease in the reliability of the rotating mechanism 54 due to the conduction of the heat generated in the phosphor 40. Further, the light source apparatus and the projector according to the second embodiment can have high reliability and form and project a high-luminance image by using the wavelength converter, which can prevent a decrease in the reliability of the rotating mechanism 54.

Further, in the wavelength converter 50B according to the second embodiment, the heat insulating member 63 is provided between the shaft member 56 and the substrate 46. The heat insulating member 63 can therefore suppress the conduction of the heat flux H generated in the phosphor 40 to the shaft member 56. In particular, the shaft member 56 is a member inserted through the motor main body 55, and preventing the conduction of the heat flux H to the shaft member 56 provides the effect of further increasing the reliability of the rotating mechanism 54. The wavelength converter 50B according to the second embodiment can therefore enhance the effect of preventing a decrease in the reliability of the rotating mechanism 54 in accordance with the heat insulating property of the heat insulating member 63.

Third Embodiment

A wavelength converter, a light source apparatus, and a projector according to a third embodiment will subsequently be described. The third embodiment differs from the second embodiment in terms of the configuration of the wavelength converter, and the other configurations of the light source apparatus and the projector are the same in the second and third embodiments. Therefore, in the following description, the configuration of the wavelength converter in the third embodiment, which differs from the configuration of the wavelength converter in the second embodiment, will be primarily described, and the same configurations and members as those in the second embodiment have the same reference characters and will not be described in detail.

Figure 5:
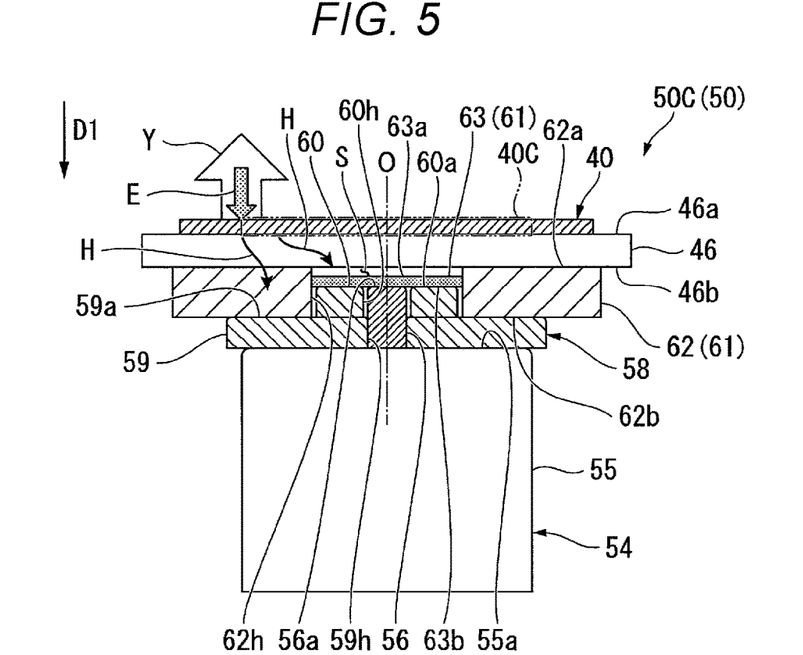
FIG. 5 is a side view of a wavelength converter according to a third embodiment and can be used in the light source apparatus of the illuminator shown in FIG. 2.

FIG. 5 is a side view of a wavelength converter 50C according to the third embodiment. In the wavelength converter 50C, an air gap S is provided between the heat insulating member 63 and the substrate 46 in the configuration of the wavelength converter 50B according to the second embodiment, as shown in FIG. 5. That is, the upper surface 63a of the heat insulating member 63 is separate from the lower surface 46b of the substrate 46, and the lower surface 63b of the heat insulating member 63 is in contact with an upper surface 56a of the shaft member 56.

The wavelength converter 50C, the light source apparatus, and the projector according to the third embodiment described above provide the following effects.

The wavelength converter 50C, the light source apparatus, and the projector according to the third embodiment, which have the same basic configurations as those of the wavelength converter 50B, the light source apparatus, and the projector according to the second embodiment, provide the same advantageous effects as those provided by the wavelength converter 50B, the light source apparatus, and the projector according to the second embodiment.

Further, in the wavelength converter 50C according to the third embodiment, since the air gap S is provided between the heat insulating member 63 and the substrate 46, the heat insulation between the substrate 46 and the shaft member 56 is increased, and the conduction of the heat flux H to the shaft member 56 is further suppressed, whereby a decrease in the reliability of the rotating mechanism 54 can be further suppressed.

Although not shown, the air gap S may instead be provided between the heat insulating member 63 and the shaft member 56. That is, the upper surface 63a of the heat insulating member 63 may be in contact with the lower surface 46b of the substrate 46, and the lower surface 63b of the heat insulating member 63 may be separate from the upper surface 56a of the shaft member 56. Also in the configuration described above, the heat insulation between the substrate 46 and the shaft member 56 is increased, and the conduction of the heat flux H to the shaft member 56 is further suppressed, whereby a decrease in the reliability of the rotating mechanism 54 can be further suppressed.

Fourth Embodiment

A wavelength converter, a light source apparatus, and a projector according to a fourth embodiment will subsequently be described. The fourth embodiment differs from the first embodiment in terms of the configuration of the wavelength converter, and the other configurations of the light source apparatus and the projector are the same in the first and fourth embodiments. Therefore, in the following description, the configuration of the wavelength converter in the fourth embodiment, which differs from the configuration of the wavelength converter in the first embodiment, will be primarily described, and the same configurations and members as those in the first embodiment have the same reference characters and will not be described in detail.

Figure 6:
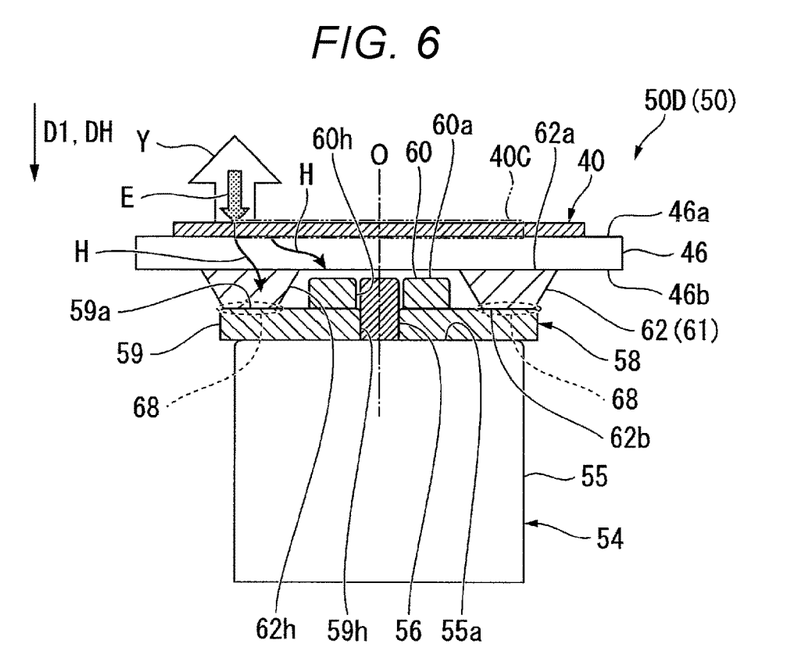
FIG. 6 is a side view of a wavelength converter according to a fourth embodiment and can be used in the light source apparatus of the illuminator shown in FIG. 2.

FIG. 6 is a side view of a wavelength converter 50D according to the fourth embodiment. In the wavelength converter 50D, the heat insulating member (first heat insulating member provided between wavelength conversion element and rotating mechanism) 62 is provided with a reduction section 68, the cross-sectional area of which in the direction that intersects a heat flux traveling direction DH, in which the heat flux H from the phosphor 40 travels from above to below, (that is, rightward/leftward direction) is smaller than the cross-sectional areas of the other portions of the heat insulating member 62, as shown in FIG. 6. Specifically, in the wavelength converter 50D, the reduction section 68 is provided at the lower end of the heat insulating member 62, and the rightward/leftward width of the heat insulating member 62 decreases as distance along the light incident direction D1. The cross-sectional area of the reduction section 68 is preferably greater than or equal to 30% but smaller than or equal to 70% of the maximum cross-sectional area of the heat insulating member 62 from the viewpoint of narrowing the path of the heat flux H from the phosphor 40 and appropriately maintaining the strength with which the heat insulating member 62 supports the phosphor 40 and the substrate 46.

The wavelength converter 50D, the light source apparatus, and the projector according to the fourth embodiment described above provide the following effects.

The wavelength converter 50D, the light source apparatus, and the projector according to the fourth embodiment, which have the same basic configurations as those of the wavelength converter 50A, the light source apparatus, and the projector according to the first embodiment, provide the same advantageous effects as those provided by the wavelength converter 50A, the light source apparatus, and the projector according to the first embodiment.

Further, in the wavelength converter 50D according to the fourth embodiment, since the heat insulating member 62 is provided with the reduction section 68, the path of the heat flux H in the heat insulating member 62 is partially narrowed, so that the heat from the phosphor 40 is further unlikely to be transferred to the rotating mechanism 54, whereby a decrease in the reliability of the rotating mechanism 54 can be further suppressed.

Although not shown, the reduction section 68 may instead be located at the upper end of the heat insulating member 62 or roughly at the middle of the heat insulating member 62 in the light incident direction D1. The path of the heat flux H in the heat insulating member 62 can be partially narrowed irrespective of the position where the reduction section 68 is provided, whereby a decrease in the reliability of the rotating mechanism 54 can be further suppressed.

Fifth Embodiment

A wavelength converter, a light source apparatus, and a projector according to a fifth embodiment will subsequently be described. The fifth embodiment differs from the first embodiment in terms of the configuration of the wavelength converter, and the other configurations of the light source apparatus and the projector are the same in the first and fifth embodiments. Therefore, in the following description, the configuration of the wavelength converter in the fifth embodiment, which differs from the configuration of the wavelength converter in the first embodiment, will be primarily described, and the same configurations and members as those in the first embodiment have the same reference characters and will not be described in detail.

Figure 7:
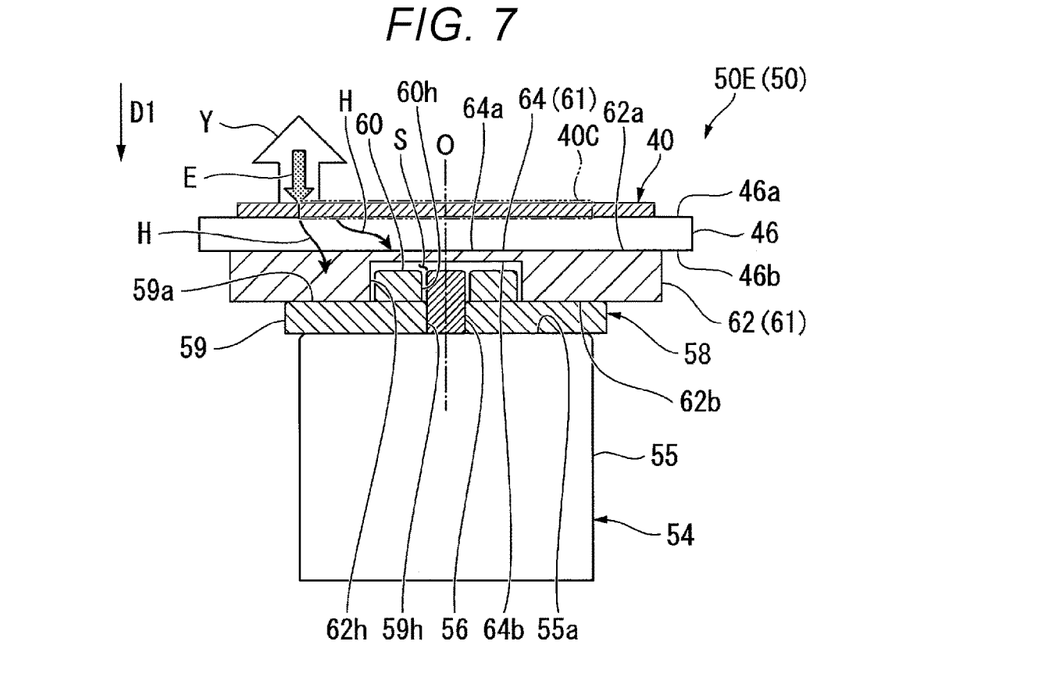
FIG. 7 is a side view of a wavelength converter according to a fifth embodiment and can be used in the light source apparatus of the illuminator shown in FIG. 2.

FIG. 7 is a side view of a wavelength converter 50E according to the fifth embodiment. In the wavelength converter 50E, the heat insulating member 61 extends between the shaft member 56 and the substrate 46, as shown in FIG. 7. That is, a heat insulating member (first heat insulating member) 64, which is made of the same material as that of the heat insulating member 62, is provided between the shaft member 56 and the substrate 46. Further, the air gap S is provided between the heat insulating member 64 and the shaft member 56. That is, an upper surface 64a of the heat insulating member 64 is in contact with the lower surface 46b of the substrate 46, and a lower surface 64b of the heat insulating member 64 is separate from the upper surface 56a of the shaft member 56.

The wavelength converter 50E, the light source apparatus, and the projector according to the fifth embodiment described above provide the following effects.

The wavelength converter 50E, the light source apparatus, and the projector according to the fifth embodiment, which have the same basic configurations as those of the wavelength converter 50A, the light source apparatus, and the projector according to the first embodiment, provide the same advantageous effects as those provided by the wavelength converter 50A, the light source apparatus, and the projector according to the first embodiment.

In the wavelength converter 50E according to the fifth embodiment, since the heat insulating member 61 extends between the shaft member 56 and the substrate 46 and the heat insulating member 64 is further provided, the conduction of the heat flux H formed of the heat generated in the phosphor 40 to the shaft member 56 is suppressed, whereby the effect of preventing a decrease in the reliability of the rotating mechanism 54 can be enhanced in accordance with the heat insulating properties of the heat insulating members 61 and 64.

Further, in the wavelength converter 50E according to the fifth embodiment, since the air gap S is provided between the heat insulating member 64 and the shaft member 56, the heat insulation between the substrate 46 and the shaft member 56 is increased, and the conduction of the heat flux H to the shaft member 56 is further suppressed, whereby a decrease in the reliability of the rotating mechanism 54 can be further suppressed.

Although not shown, the air gap S in the fifth embodiment may instead be provided between the heat insulating member 64 and the substrate 46. That is, the upper surface 64a of the heat insulating member 64 may be separate from the lower surface 46b of the substrate 46, and the lower surface 64b of the heat insulating member 64 may be in contact with the upper surface 56a of the shaft member 56. Also in the configuration described above, the heat insulation between the substrate 46 and the shaft member 56 is increased, and the conduction of the heat flux H to the shaft member 56 is further suppressed, whereby a decrease in the reliability of the rotating mechanism 54 can be further suppressed.

Other Embodiments

In each of the embodiments described above, the phosphor 40 and the substrate 46 each have a disk-like shape when viewed in the light incident direction D1 and have no hole formed in a central portion containing the axis of rotation O. In the embodiments of the invention, however, the phosphor 40 and the substrate 46 may each have a hole formed in a central portion containing the axis of rotation O as long as the phosphor 40 has the coinciding section 40C.

Figure 8:
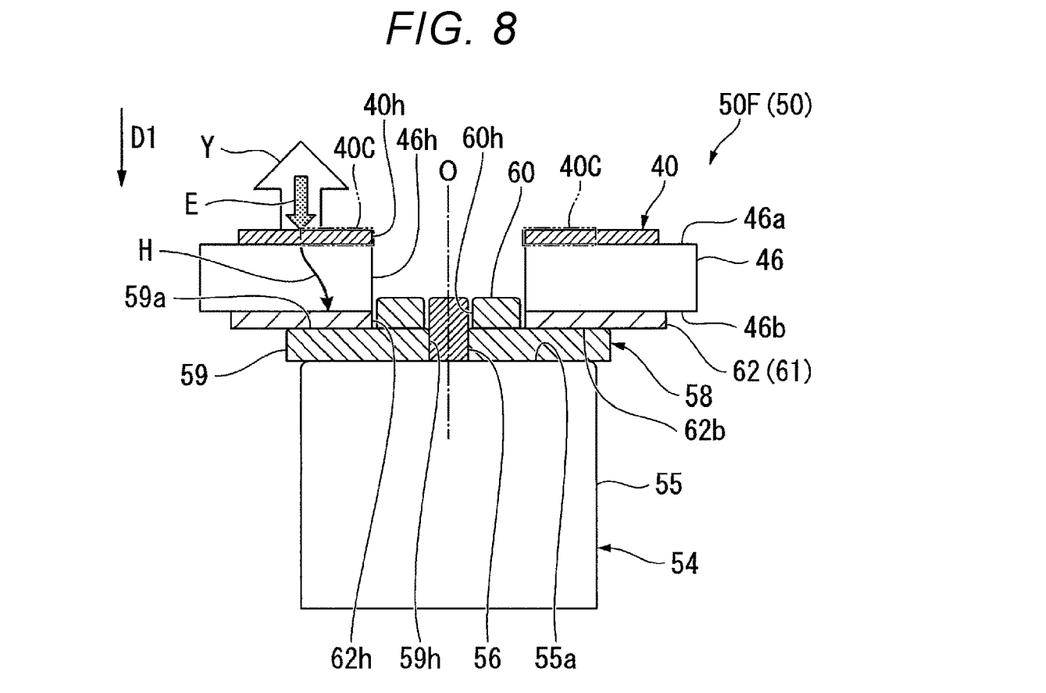
FIG. 8 is a side view of a wavelength converter according to another embodiment and can be used in the light source apparatus of the illuminator shown in FIG. 2.

FIG. 8 is a side view of a wavelength converter 50F according to another embodiment in which the wavelength converter 50A according to the first embodiment is changed from the viewpoint described above. In the wavelength converter 50F, holes 40h and 46h, which coincide with the hole 62h in the heat insulating member 62, are formed in the phosphor 40 and the substrate 46, specifically, in central portions thereof containing the axis of rotation O, respectively, as shown in FIG. 8. Upper portions of the protrusion 60 of the hub 58 and the shaft member 56 are exposed through the holes 40h, 46h, and 62h. The coinciding section 40C is an inner circumferential portion, which is part of the phosphor 40 and surrounds the hole 40h when viewed in the light incident direction D1.

Also in the wavelength converter 50F described above, the size of the phosphor 40 is closer to the size of the rotating mechanism 54 when viewed in the light incident direction D1 than in related art, whereby the size of the wavelength converter 50F can be reduced. Since the heat insulating member is provided between the phosphor 40 and the rotating mechanism 54, the heat insulating member 62 can block the heat flux H formed of the heat generated in the phosphor 40 and dissipated toward the rotating mechanism 54 and can therefore prevent a decrease in the reliability of the rotating mechanism 54 due to the conduction of the heat generated in the phosphor 40 to the rotating mechanism 54.

The wavelength converter 50F further provides the same advantageous effects as those provided by the wavelength converter 50A according to the first embodiment in addition to the above advantageous effects.

Preferable embodiments of the invention have been described above in detail. The invention is, however, not limited to a specific embodiment, and a variety of modifications and changes can be made to the embodiments within the scope of the substance of the invention set forth in the appended claims.

For example, in each of the embodiments described above, the phosphor 40, which emits the yellow fluorescence Y when excited with the blue light E, has been presented by way of example as the wavelength conversion element according to an aspect of the invention. The wavelength conversion element may be any of wide variety of other elements that convert the wavelength of the first light to emit the second light having a wavelength different from the wavelength of the first light with heat generated in the wavelength conversion process.

Further, in each of the embodiments described above, the projector 1 including the three light modulators 4R, 4G, and 4B is presented by way of example. Instead, the projector 1 according to each of the embodiments of the invention may be a projector that uses a single light modulator to display color video images. Further, a digital micromirror device may be used as each of the light modulators.

The entire disclosure of Japanese Patent Application No. 2018-061408, filed on Mar. 28, 2018 is expressly incorporated by reference herein.

What is claimed is:

1. A wavelength converter comprising:
a phosphor layer that converts a wavelength of first light to emit second light having a wavelength different from the wavelength of the first light;
a rotating mechanism that rotates the phosphor layer around an axis of rotation that extends in a direction in which the first light is incident; and
a first heat insulating member that is provided between the phosphor layer and the rotating mechanism in the first light incident direction,
wherein the phosphor layer has a coinciding section that coincides with the rotating mechanism when viewed in the first light incident direction.

2. The wavelength converter according to claim 1, further comprising a substrate to which the phosphor layer is fixed, wherein the rotating mechanism includes
a shaft member that rotates around the axis of rotation, and
a rotary member that is fixed to the shaft member and rotates when the shaft member rotates, and
the rotary member fixes the substrate via the first heat insulating member.

3. The wavelength converter according to claim 2, wherein the first heat insulating member extends between the shaft member and the substrate.

4. The wavelength converter according to claim 2, wherein a second heat insulating member having a heat insulating property different from a heat insulating property of the first heat insulating member is provided between the shaft member and the substrate.

5. The wavelength converter according to claim 3, wherein an air gap is provided between the first heat insulating member, which is provided between the shaft member and the substrate, and the substrate or between the first heat insulating member, which is provided between the shaft member and the substrate, and the shaft member.

6. The wavelength converter according to claim 4, wherein an air gap is provided between the second heat insulating member and the substrate or between the second heat insulating member and the shaft member.

7. The wavelength converter according to claim 1, wherein the first heat insulating member provided between the phosphor layer and the rotating mechanism is provided with a reduction section having a cross-sectional area in a direction that intersects a direction in which a heat flux from the phosphor layer travels, the cross-sectional area being smaller than cross-sectional areas of other portions of the first heat insulating member.

8. The wavelength converter according to claim 2, wherein a maximum radius of the substrate measured from the axis of rotation when viewed in the first light incident direction is greater than or equal to 100% and smaller than or equal to 130% of a maximum radius of the phosphor layer.

9. A light source apparatus comprising:
the wavelength converter according to claim 1; and
a light source that outputs the first light toward the phosphor layer.

10. A light source apparatus comprising:
the wavelength converter according to claim 2; and
a light source that outputs the first light toward the phosphor layer.

11. A light source apparatus comprising:
the wavelength converter according to claim 3; and
a light source that outputs the first light toward the phosphor layer.

12. A light source apparatus comprising:
the wavelength converter according to claim 4; and
a light source that outputs the first light toward the phosphor layer.

13. A light source apparatus comprising:
the wavelength converter according to claim 5; and
a light source that outputs the first light toward the phosphor layer.

14. A light source apparatus comprising:
the wavelength converter according to claim 6; and
a light source that outputs the first light toward the phosphor layer.

15. A projector comprising:
the light source apparatus according to claim 9;
a light modulator that modulates light outputted from the light source apparatus in accordance with image information to form image light; and
a projection system that projects the image light.

16. A projector comprising:
the light source apparatus according to claim 10;
a light modulator that modulates light outputted from the light source apparatus in accordance with image information to form image light; and
a projection system that projects the image light.

17. A projector comprising:
the light source apparatus according to claim 11;
a light modulator that modulates light outputted from the light source apparatus in accordance with image information to form image light; and
a projection system that projects the image light.

18. A projector comprising:
the light source apparatus according to claim 12;
a light modulator that modulates light outputted from the light source apparatus in accordance with image information to form image light; and
a projection system that projects the image light.

19. A projector comprising:
the light source apparatus according to claim 13;
a light modulator that modulates light outputted from the light source apparatus in accordance with image information to form image light; and
a projection system that projects the image light.

20. A projector comprising:
the light source apparatus according to claim 14;
a light modulator that modulates light outputted from the light source apparatus in accordance with image information to form image light; and
a projection system that projects the image light.

* * * * *